(12) United States Patent
Paing et al.

(10) Patent No.: US 7,959,205 B2
(45) Date of Patent: Jun. 14, 2011

(54) LATCH ASSEMBLY FOR VEHICLE SEAT

(75) Inventors: Hyun Sung Paing, Incheon (KR); Jun Kyu Park, Incheon (KR)

(73) Assignee: Austem Co., Ltd. (KR)

( * ) Notice: Subject to any disclaimer, the term of this patent is extended or adjusted under 35 U.S.C. 154(b) by 182 days.

(21) Appl. No.: 12/431,482

(22) Filed: Apr. 28, 2009

(65) Prior Publication Data

US 2010/0259061 A1    Oct. 14, 2010

(30) Foreign Application Priority Data

Apr. 8, 2009 (KR) .......................... 10-2009-0030135

(51) Int. Cl.
*B60N 2/02* (2006.01)
(52) U.S. Cl. .................................................... 296/65.03
(58) Field of Classification Search ............... 296/65.03, 296/37.6, 37.12, 76; 292/216, 340, 201
See application file for complete search history.

(56) References Cited

U.S. PATENT DOCUMENTS

| | | | | |
|---|---|---|---|---|
| 3,905,624 A | * | 9/1975 | Fujita | 292/11 |
| 3,953,069 A | * | 4/1976 | Tamura et al. | 297/367 R |
| 4,298,223 A | * | 11/1981 | Raffelsiefer et al. | 292/216 |
| 4,337,978 A | * | 7/1982 | Kazaoka et al. | 297/367 R |
| 4,640,545 A | * | 2/1987 | von Wimmersperg | 297/216.11 |
| 4,869,536 A | * | 9/1989 | Kleefeldt | 292/210 |
| 4,913,494 A | * | 4/1990 | Ikegaya | 297/367 R |
| 5,000,495 A | * | 3/1991 | Wolfgang et al. | 292/216 |
| 5,071,178 A | * | 12/1991 | Brackman et al. | 292/216 |
| 5,180,198 A | * | 1/1993 | Nakamura et al. | 292/201 |
| 5,195,802 A | | 3/1993 | Hayakawa et al. | |
| 5,232,253 A | * | 8/1993 | Tamiya | 292/201 |
| 5,308,128 A | * | 5/1994 | Portelli et al. | 292/216 |
| 5,425,568 A | * | 6/1995 | Sliney et al. | 297/378.11 |
| 5,433,496 A | * | 7/1995 | Zimmermann | 292/201 |
| 5,498,040 A | * | 3/1996 | Silye | 292/201 |
| 5,649,726 A | * | 7/1997 | Rogers et al. | 292/201 |
| 5,678,869 A | * | 10/1997 | Yoshikuwa | 292/216 |
| 5,730,480 A | * | 3/1998 | Takamura | 248/503.1 |
| 5,788,330 A | * | 8/1998 | Ryan | 297/378.12 |
| 5,938,252 A | * | 8/1999 | Uemura et al. | 292/201 |
| 6,012,747 A | * | 1/2000 | Takamura et al. | 292/216 |

(Continued)

FOREIGN PATENT DOCUMENTS

JP    2001277916    10/2001

*Primary Examiner* — Kiran B. Patel
(74) *Attorney, Agent, or Firm* — Schmeiser, Olsen & Watts LLP (57) ABSTRACT

A latch assembly for vehicle seat comprising a base having a receiving pocket accommodating a striker of a vehicle body part, a catch rotatably coupled to the base rotating between a locking position where the catch supports the striker and an unlocking position where the catch allows the striker to escape, a damping plate rotatably coupled to the base with the same rotating axis as the catch elastically pressing catch to rotate to the unlocking position and having a damping surface elastically pressing and supporting the striker, a pawl plate rotatably coupled to base having a pressing surface pressing the catch rotated to the locking position, a pawl rotatably coupled to base having the same rotating axis as the pawl plate and having a supporting surface supporting catch preventing further rotation if the catch at locking position rotates passing the pressing surface of pawl plate due to an outer impact.

15 Claims, 6 Drawing Sheets

U.S. PATENT DOCUMENTS

| | | | |
|---|---|---|---|
| 6,012,771 A * | 1/2000 | Shea | 297/216.1 |
| 6,022,166 A * | 2/2000 | Rogers et al. | 403/322.4 |
| 6,053,542 A * | 4/2000 | Ostrowski et al. | 292/201 |
| 6,123,379 A * | 9/2000 | Yamada et al. | 296/65.03 |
| 6,139,104 A * | 10/2000 | Brewer | 297/353 |
| 6,139,105 A * | 10/2000 | Morgos et al. | 297/378.12 |
| 6,152,515 A * | 11/2000 | Wieclawski | 296/65.03 |
| 6,293,620 B1 * | 9/2001 | Fast | 297/325 |
| 6,345,867 B1 * | 2/2002 | Hellrung et al. | 297/336 |
| 6,354,663 B1 * | 3/2002 | Zhang et al. | 297/336 |
| 6,502,903 B2 * | 1/2003 | Bruck et al. | 297/378.11 |
| 6,523,899 B1 * | 2/2003 | Tame | 297/331 |
| 6,550,864 B1 * | 4/2003 | Zarna et al. | 297/378.12 |
| 6,598,938 B2 * | 7/2003 | Boltze et al. | 297/367 R |
| 6,629,710 B1 * | 10/2003 | Shafry et al. | 292/216 |
| 6,685,270 B2 * | 2/2004 | Haglund | 297/367 R |
| 6,733,078 B1 * | 5/2004 | Zelmanov | 297/378.1 |
| 6,820,912 B1 * | 11/2004 | Lavoie | 296/65.03 |
| 6,863,330 B2 * | 3/2005 | Yokoyama et al. | 296/65.03 |
| 6,863,347 B2 * | 3/2005 | De Nichilo | 297/378.12 |
| 7,044,552 B2 * | 5/2006 | Muller et al. | 297/336 |
| 7,134,703 B2 * | 11/2006 | Jeong | 296/65.03 |
| 7,198,316 B2 * | 4/2007 | Lutzka et al. | 296/65.03 |
| 7,222,907 B2 * | 5/2007 | Lutzka et al. | 296/65.03 |
| 7,296,840 B2 * | 11/2007 | Martone et al. | 296/65.03 |
| 7,325,874 B2 * | 2/2008 | Zhang | 297/336 |
| 7,357,436 B2 * | 4/2008 | Willing et al. | 296/65.03 |
| 7,416,254 B2 * | 8/2008 | Jennings | 297/378.12 |
| 7,475,923 B2 * | 1/2009 | Ottino et al. | 292/216 |
| 7,494,186 B2 * | 2/2009 | Paing et al. | 297/378.12 |
| 7,547,070 B2 * | 6/2009 | Nathan et al. | 297/378.12 |
| 7,575,280 B2 * | 8/2009 | Palomba et al. | 297/336 |
| 7,758,122 B2 * | 7/2010 | Haida et al. | 297/336 |
| 7,780,234 B2 * | 8/2010 | Grable et al. | 297/331 |
| 7,854,461 B2 * | 12/2010 | Yamada | 296/65.05 |

* cited by examiner

LATCH ASSEMBLY FOR VEHICLE SEAT

TECHNICAL FIELD

The present invention relates to a latch assembly for a vehicle seat, and more particularly, to a latch assembly mounted to a vehicle seat to assemble and disassemble the vehicle seat to a chassis.

BACKGROUND ART

A latch assembly for a vehicle seat is an apparatus for assembling and disassembling a vehicle seat to a chassis.

Among various requirements for such a latch assembly for a vehicle seat, it is required that a coupling state of the latch assembly for a vehicle seat should be certainly maintained even though an impact is applied through the chassis, that is, safety.

It is also required that when there are a lot of variables in coupling the latch assembly, for example, when there are manufacturing tolerances related to the coupling of the latch assembly, the latch assembly should operate without difficulty by extensively accommodating the manufacturing tolerances.

Especially, in addition to the above requirements, the latch assembly for a vehicle seat is required to be easily operated with only a small operating force and to prevent a generation of rattling noise due to clearances in its coupled state.

To satisfy the above requirements, a lot of technologies have been developed, and among latch assemblies in use now, a technology having a base, a catch rotatably coupled to the base and a pawl rotatably coupled to the base to interact with the catch has been introduced.

Nevertheless, there has still been a demand for an improved latch assembly for a vehicle seat to satisfy the above requirements.

DISCLOSURE

Technical Problem

The present invention is proposed to satisfy the above requirements for a latch assembly for a vehicle seat and it is an aspect of the present invention to provide a latch assembly for a vehicle seat which can operate without difficulty even if there are errors to some degree in a coupling condition as well as provide safety, which can accommodate an operating convenience by enabling a smooth operation with only a small operating force, and which can prevent a generation of rattling noise due to clearances in its coupled state.

Technical Solution

The foregoing and/or other aspects of the present invention can be achieved by providing a latch assembly for vehicle seat, comprising: a base having a receiving pocket for accommodating a striker of a vehicle body part; a catch rotatably coupled to the base to rotate between a locking position where the catch supports the striker accommodated in the receiving pocket and an unlocking position where the catch allows the striker to escape from the receiving pocket; a damping plate rotatably coupled to the base with the same rotating axis as the catch to elastically press the catch to rotate to the unlocking position and having a damping surface which elastically presses and supports the striker accommodated in the receiving pocket; a pawl plate rotatably coupled to the base and having a pressing surface which presses the catch rotated to the locking position; and a pawl rotatably couple to the base with the same rotating axis as the pawl plate and having a supporting surface which supports the catch to prevent a further rotation of the catch if the catch at the locking position starts rotating by passing the pressing surface of the pawl plate due to an outer impact.

According to an aspect of the present invention, the damping plate and the cam are rotatable therebetween to a predetermined degree of angle through a pin which is provided at one of the damping plate and the cam and a slot which is provided at the other of the damping plate and the cam to couple with the pin.

According to an aspect of the present invention, the pin is provided to the catch and the slot is provided to the damping plate.

According to an aspect of the present invention, the catch has a catch pocket which, at the locking position of the catch, accommodates and supports the striker accommodated in the receiving pocket of the base, and the damping surface of the damping plate, at the locking position of the catch, elastically presses and supports the striker accommodated in the receiving pocket in a state that the damping surface protrudes into an inside of the catch pocket.

According to an aspect of the present invention, at least a side part of the damping plate including the damping surface has a thickness bigger than any other part thereof, so that an area of the damping surface for pressing and supporting the striker is increased.

According to an aspect of the present invention, at least a part of the damping plate including the damping surface is made of a plastic resin.

According to an aspect of the present invention, the catch has a locking surface which at the locking position of the catch is supported by the pressing surface of the pawl plate, and the pressing surface of the pawl plate is a part of an arc whose center is at a distance from a rotating center of the pawl plate and forms a predetermined pressure angle by contacting the locking surface if the catch is at the locking position.

According to an aspect of the present invention, the pawl plate has a second supporting surface to support the catch together with the supporting surface of the pawl if the catch at the locking position starts rotating by passing the pressing surface of the pawl plate due to the outer impact.

According to an aspect of the present invention, at the locking position of the catch the striker accommodated in the receiving pocket of the base is supported by the receiving pocket, the catch and the damping plate at the same time.

Advantageous Effects

The latch assembly for vehicle seat according to the present invention described above has, when a catch is locked to a striker, not only a pawl plate to support the catch but also a pawl to additionally support the catch in case of an impact thus preventing more effectively a release of a locking state and providing a more enhanced safety.

Also, the pawl plate presses the catch while the striker is locked by the catch, so that the striker can maintain its state of being contacted and supported by the catch even if a locking position of the striker is a little changed. Therefore, the latch assembly for a vehicle seat according to the present invention can operate without difficulty even if there are errors to some degree in a coupling condition of the striker.

Also, a damping plate presses and supports the striker elastically when the catch locks the striker, a generation of a rattling noise induced by the striker having clearances in its locked state can be prevented.

Also, as the catch is not provided with its own spring for its rotation but is elastically pressed and rotated by the damping plate, it doesn't have to substantially press the pawl plate supporting the catch when the damping plate is stopped by the striker in a locking state with a condition that the catch and the damping plate is coupled together by pin and slot. Accordingly, a force of the pawl plate supporting the catch is reduced, and a force required for an unlocking operation of the pawl plate which has been supporting the catch in the locking state can also be reduced so much. Therefore, a user can easily and conveniently perform the unlocking operation.

BEST MODE

Hereinafter, an exemplary embodiment of the present invention will be described by referring to the accompanying figures.

Figure 1:
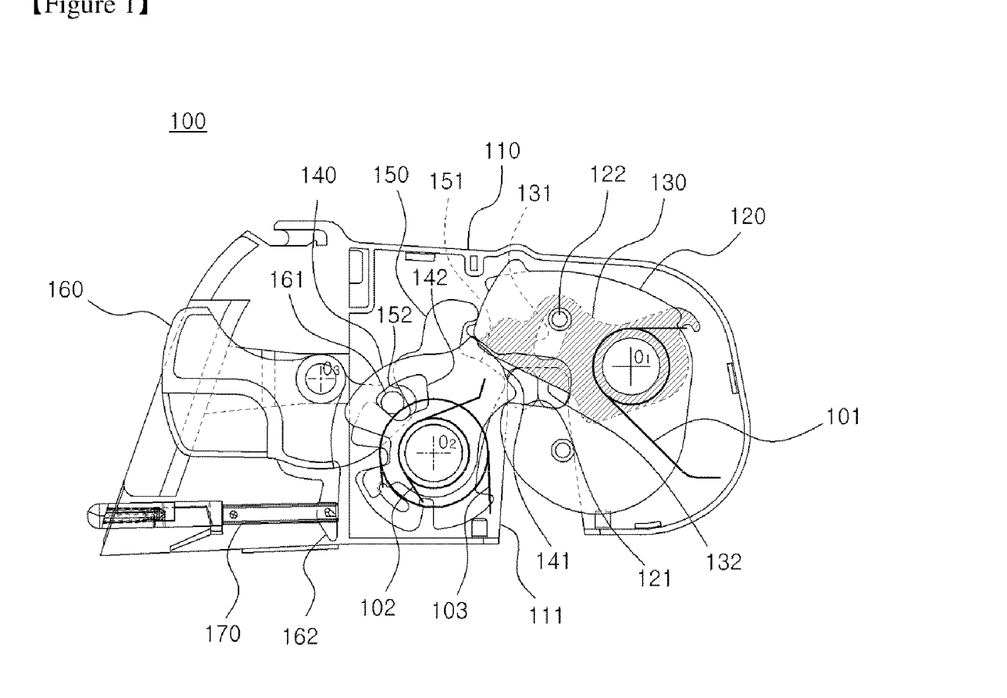
FIG. 1 is a plan view showing an inside of a latch assembly for a vehicle seat according to an exemplary embodiment of the present invention.

A latch assembly 100 for a vehicle seat according to an exemplary embodiment of the present invention, as shown in FIG. 1, comprises a base 110, a catch 120 and a damping plate 130 which are rotatably coupled to the base with the same rotating axis therebetween, and a pawl plate 140 and a pawl 150 which are rotatably coupled to the base 110 at an opposite side of the catch 120 with the same rotating axis therebetween.

The base 110 supports other components of the latch assembly 100. The base 110 has a receiving pocket 111 at its lower side to receive and support a striker 1 (refer to FIG. 3A) at a chassis part.

The catch 120 is rotatably coupled to the base 110 with a rotating center at O1. The catch 120 rotates between a locking position (refer to FIG. 3E) where it supports the striker 1 inserted in the receiving pocket 111 and an unlocking position (refer to FIG. 2) where it allows the striker 1 to escape from the receiving pocket 111.

The catch 120 has a catch pocket 121 to receive and support the striker 1 inserted in the receiving pocket 111.

The catch 120 has a structure of two guiding surfaces 123 and 125 (refer to FIG. 3C) of different layers therebetween to interact with the pawl plate 140 and the pawl 150.

To form such a structure of two layers, the catch 120 may be formed by overlapping and combining two plate members having the guide surfaces 123 and 125 or formed as one body having the two layers by injection molding or etc.

The damping plate 130 is rotated around the same rotating axis O1 as the catch 120. The damping plate 130 and the catch 120 are coupled together by pin-slot coupling through a slot 131 and a pin 122.

With the above coupling state with the catch 120, the damping plate 130 is always pressed counterclockwise by a spring 101, so that the damping plate 130 presses the catch 120 to rotate counterclockwise, that is toward the unlocking position, through the pin 122 and slot 131 coupling.

Also, the damping plate 130 can rotate further counterclockwise with regard to the catch 120 as much as a path of the slot 131 due to the pin 122 and slot 131 coupling with the catch 120, so that the damping plate 130 can have a damping surface 132 to protrude into an inner space of the catch pocket 121. Through the damping surface 132, the damping plate 130 can press and support the striker 1 accommodated in the catch pocket 121.

The pawl plate 140 and the pawl 150 rotate around a rotating center O2, which is provided at a left side of the receiving pocket 111 in the base 110, to interact with the catch 120.

The pawl plate 140 is pressed by a spring 102 to rotate clockwise, and maintains a stable locking state of the catch 120 through a pressing surface 141 which presses and supports the catch 120 rotated to the locking position.

The pawl 150 is pressed by a spring 103 to rotate clockwise. Also, when the catch 120 at the locking position starts rotating counterclockwise, that is toward the unlocking position, by passing the pressing surface 141 of the pawl plate 140 due to an outer impact, the pawl 150 prevents the catch 120 from further rotating through a supporting surface 151 supporting the catch 120.

The latch assembly 100 for a vehicle seat according to the exemplary embodiment of the present invention further comprises a lever 160 to operate the counterclockwise rotations of the pawl plate 140 and the pawl 150.

The lever 160 rotates around a rotating center O3 and has at its right end a pin 161 which is inserted into a recess 152 of the pawl 150 as well as accommodated in a slot 142 of the pawl plate 140.

Therefore, if the lever 160 rotates clockwise by a user's operation, the pawl 150 and the pawl plate 140 rotate counterclockwise and release the catch 120 at the locking position, so that the catch 120 can be unlocked and rotate counterclockwise, that is, in the unlocking direction.

The lever 160 has at its lower end part a protrusion 162 which is combined with a red flag 170. In case of an unlocking operation of the lever 160, the red flag 170 protrudes to the left to inform that the latch assembly 100 is in the unlocking state (refer to FIG. 2).

Figure 2:
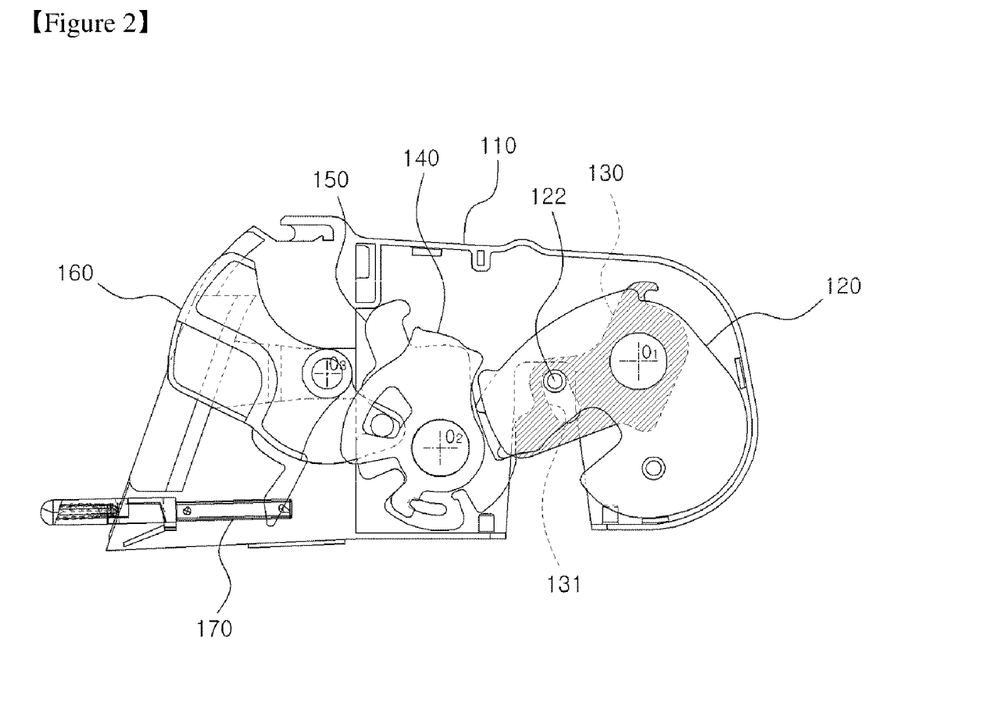
FIG. 2 is a plan view showing an unlocking state of the latch assembly for a vehicle seat in FIG. 1.

FIG. 2 shows a state of the latch assembly 100 where the catch 120 is rotated to the unlocking position.

As described above, the catch 120 can rotate to the unlocking position due to a counterclockwise elastic pressure from the damping plate 130 which is pin(122)-slot(131) coupled to the catch 120.

FIGS. 3A to 3E show a locking process of the latch assembly 100 by stages.

Figure 3A:
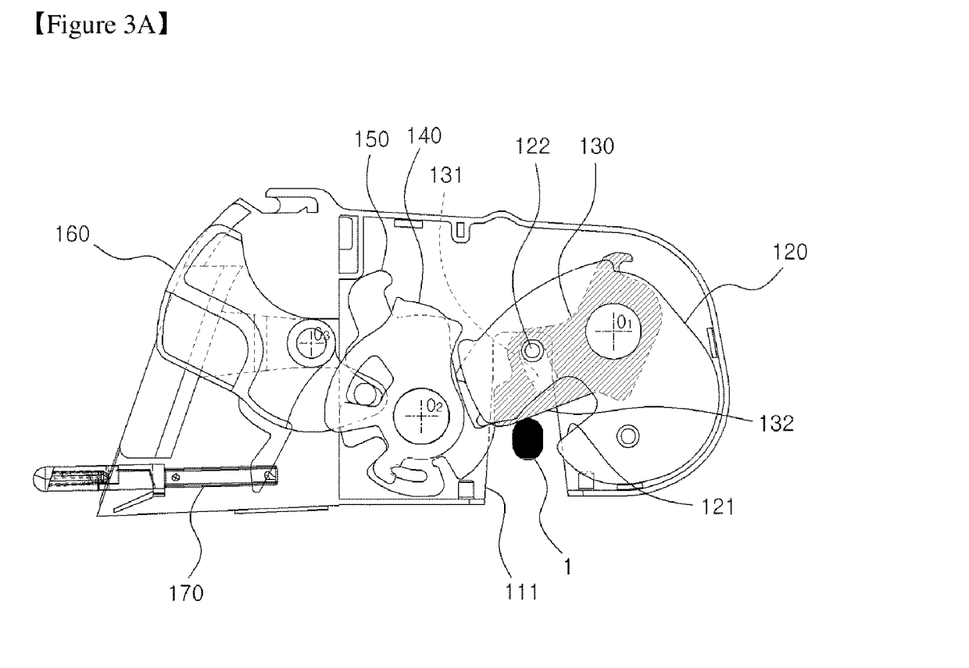
FIGS. 3A to 3E are plan views showing a locking process of the latch assembly for a vehicle seat by stages from the unlocking state of FIG. 2.

At first, referring to FIG. 3A, the striker 1 of a vehicle chassis part rises from a lower outside of the receiving pocket 111 and is inserted into the inside of the receiving pocket 111. While being inserted, the striker 1 contacts first the damping surface 132 of the damping plate 130 which has been protruding to the inside of the catch pocket 121.

Figure 3B:
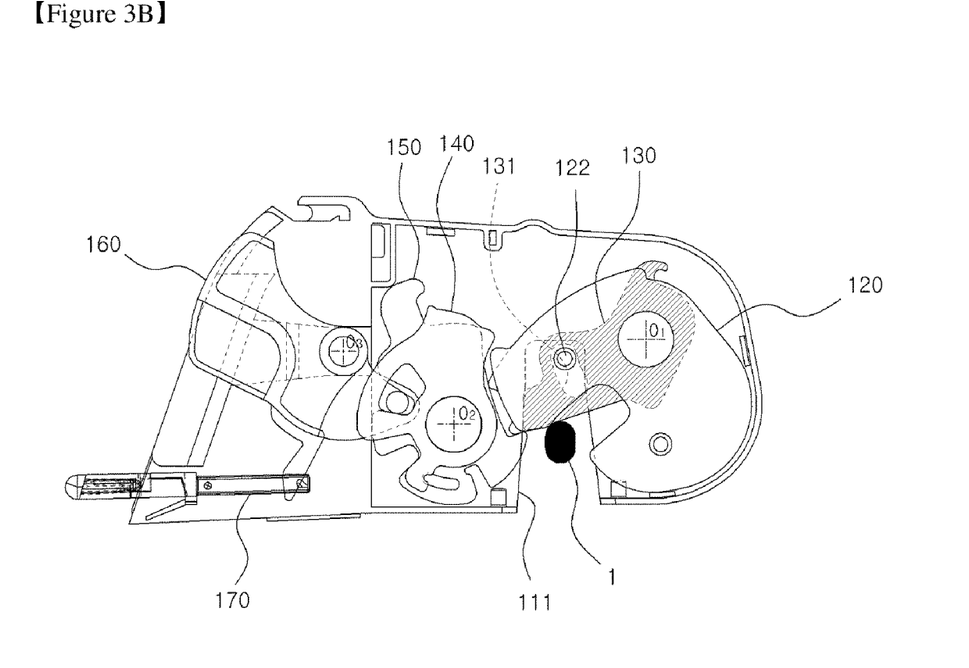

If the striker 1 rises further, as shown in FIG. 3B, the damping plate 130 rotates elastically clockwise while being in contact with the striker 1.

Although, during a process from FIG. 3A to FIG. 3B, the damping plate 130 is rotated clockwise by the striker 1, the catch 120 maintains its unlocking position due to the pin (122)-slot(131) coupling with the damping plate 130.

FIG. 3B shows both the damping plate 130 and the catch 120 contacting the striker 1 after the damping plate 130 has been rotated. Thereafter, the damping plate 130 rotates clockwise together with the catch 120.

Figure 3C:
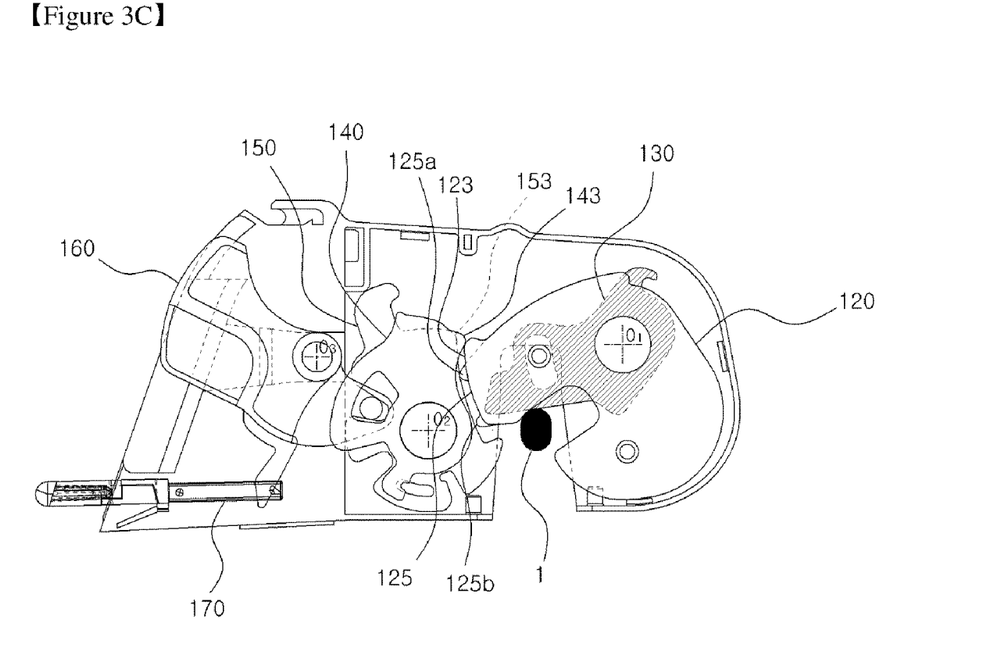

FIG. 3C shows a tip 143 of the pawl plate 140 contacting an upper end part of a first guiding surface 123 of the catch 120 due to the rotation of the catch 120.

Thereafter, as the catch 120 rotates further, the first guiding surface 123 to its lower end part is in contact with the tip 143.

Figure 3D:
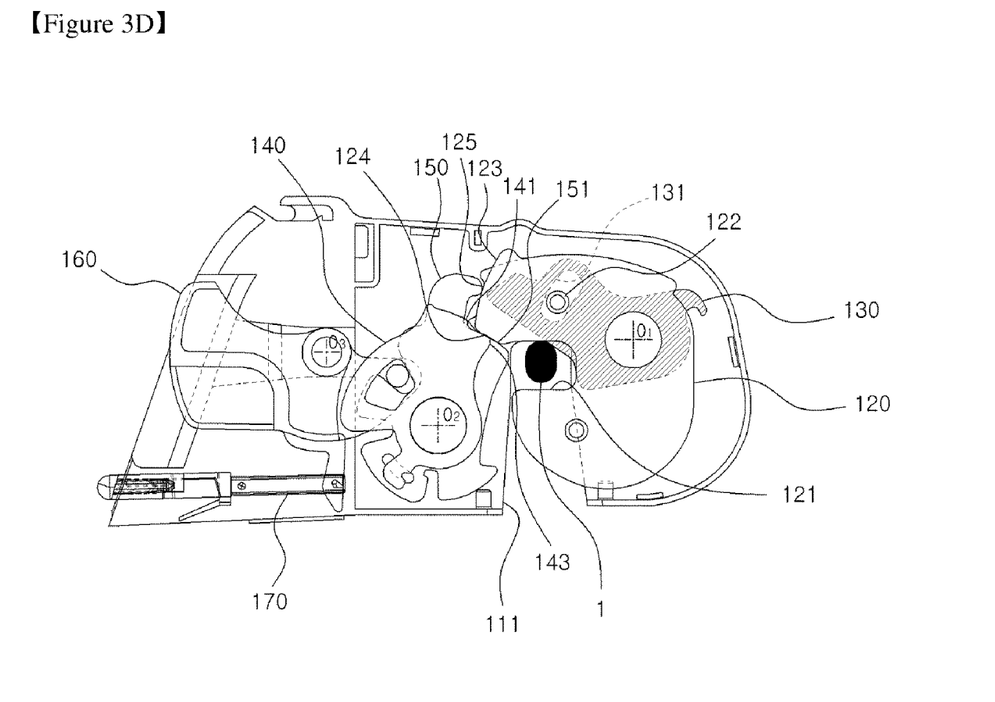

FIG. 3D shows an end of the clockwise rotation of the catch 120 due to the pressure of the rising striker 1. Thereafter, the tip 143 of the pawl plate 140 passes the lower end part of the first guiding surface 123 and enter a neighboring locking surface 124 of the catch 120, which is done by a small clockwise rotation of the pawl plate 140 that is always pressed clockwise by the spring 102 (refer to FIG. 1) and during this process a right end part of the pressing surface 141 also contacts an end part of the locking surface 124 of the catch 120.

Meanwhile, the pawl 150 contacts and slides on an upper end part 125a of a second guiding surface 125 of the rotating catch 120 as shown in FIG. 3C, and then a lower end part 125b of the second guiding surface 125 passes a tip 153 of the pawl 150 thus the pawl 150 rotating as shown in FIG. 3D, so that its supporting surface 151 contacts the locking surface 124 of the catch 120.

As it can be seen from the above description, the catch 120 has a two layer structure comprising the first guiding surface 123 and the second guiding surface 125 as its surfaces to interact with the pawl plate 140 and the pawl 150.

The pressure of the striker 1 onto the catch 120 and the damping plate 130 ends when the striker 1 reaches an upper end of the receiving pocket 111 as shown in FIG. 3D.

Figure 3E:
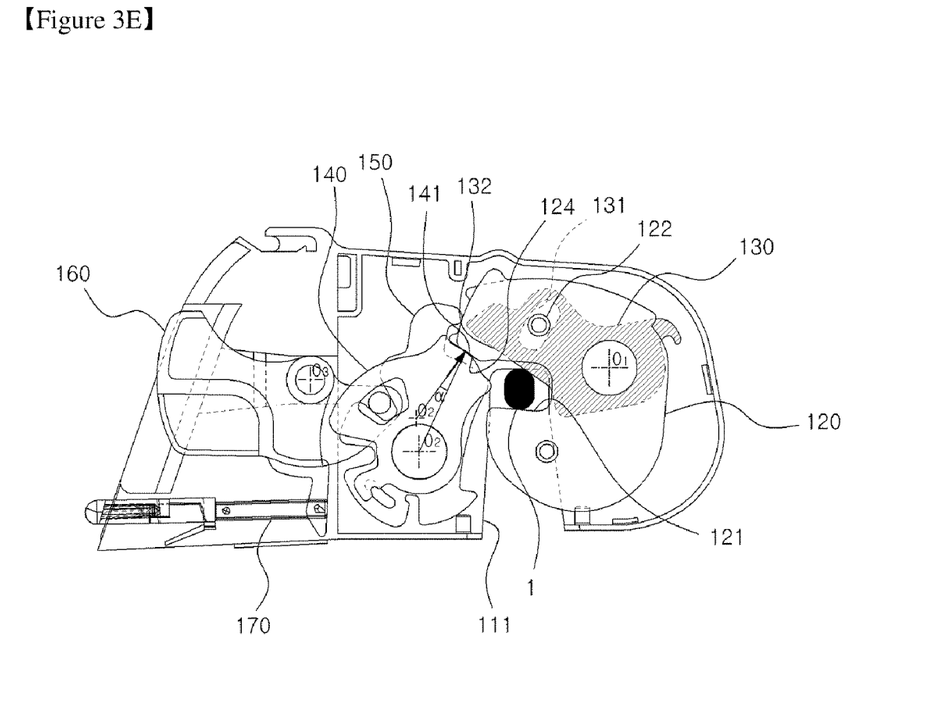

Thereafter, the process of the rotation of the catch 120 from FIG. 3D to FIG. 3E is caused by the pawl plate 140.

That is, from the state of FIG. 3D, the pawl plate 140 further rotates clockwise according to the pressure of the spring 102 (refer to FIG. 1), then the pressing surface 141 presses the locking surface 124 of the catch 120 so that the catch 120 can further rotate to its position in FIG. 3E.

Due to the further rotation of the catch 120, a lower end part of the striker 1 contacts the catch pocket 121 and is supported thereby.

Meanwhile, although the catch 120 rotates during the process from FIG. 3D to FIG. 3E, the damping plate 130 can still maintain to contact and press the striker 1 because of the pin(122)-slot(131) coupling with the catch 120.

Therefore, the striker is supported by the receiving pocket 1111 at its upper end part and by the catch pocket 121 at its lower end part and additionally supported by the damping surface 132 of the damping plate 130.

Also, as described above, as the catch 120 is pressed by the pressing surface 141 of the pawl plate 140 in its locking position, it can accommodate the striker 1 as far as it is pressed and rotated by the pressing surface 141 even though there are errors in the size or the locking position of the striker 1, in the manufacturing allowances of the latch assembly 100 and etc.

That is, the latch assembly 100 has a room for the manufacturing allowances to some extent within the accommodating space for the striker 1, the space is provided by the receiving pocket 111 and the catch pocket 121 in FIG. 3D.

Figure 4:
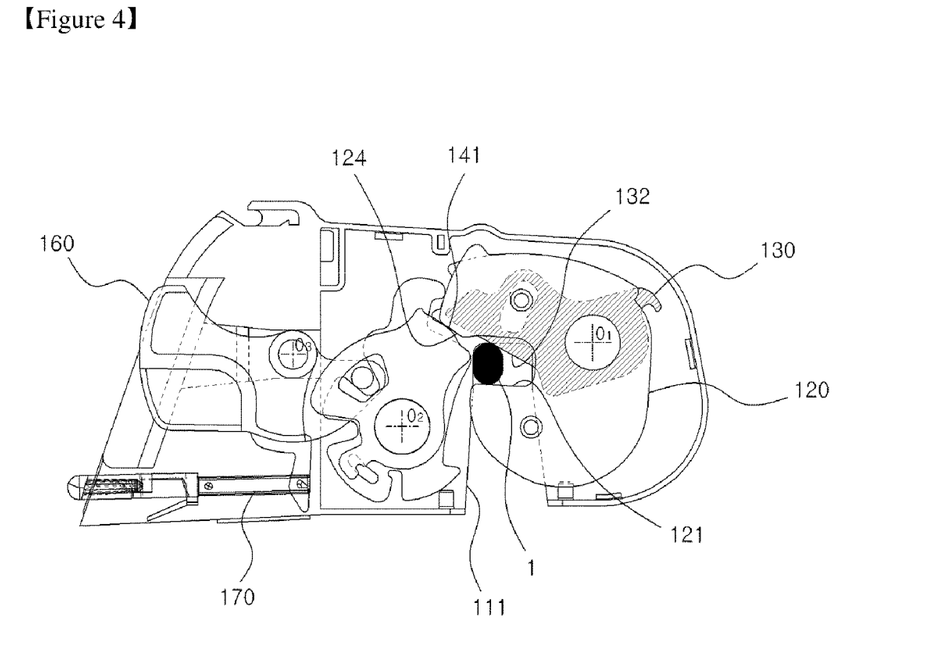
FIG. 4 and FIG. 5 show locking states of the latch assembly for a vehicle seat in FIG. 1 under different locking conditions.
Figure 5:
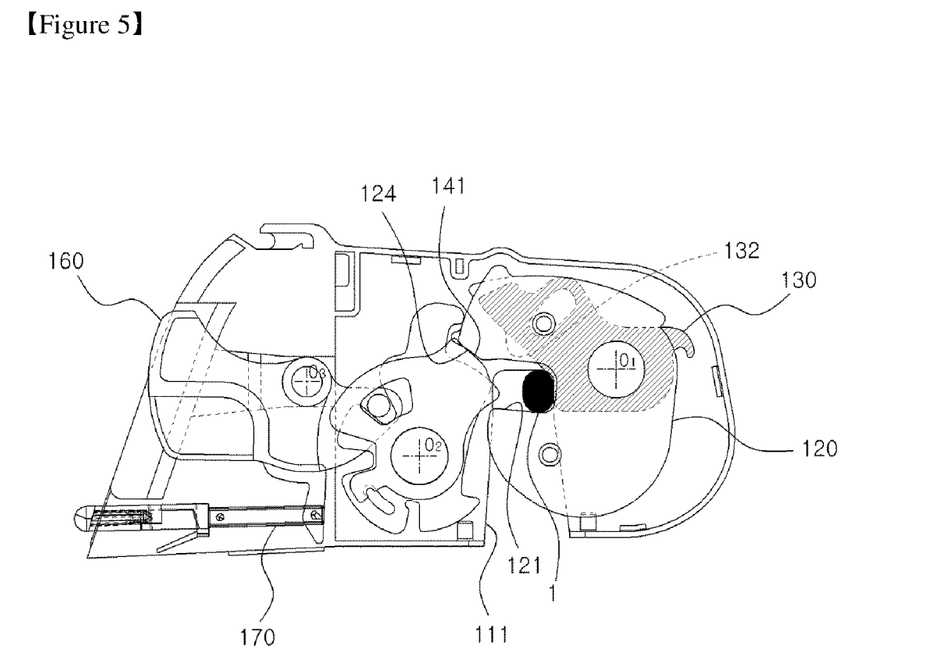

For example, when the striker 1 is locked not only at the left end part of the receiving pocket 111 as shown in FIG. 4 but also at the right end part thereof as shown in FIG. 5, the striker 1 in the locking state is still supported by the receiving pocket 111, the catch pocket 121 and the damping surface 132, where there is only a change in the position where the pressing surface 141 presses and supports the locking surface 124 of the catch 120.

In the locking state of FIG. 3E, a normal direction of the force F which is applied by the pawl plate 140 through its pressing surface 141 onto the locking surface 124 of the catch 120 forms a predetermined pressure angle $\alpha$ with a center line drawn to the rotating center O2. The pressing surface 141 is a part of an arc which has its center O2' on the normal line of the force F.

With the pressure angle $\alpha$, even if the pawl plate 140 receives an impact from the catch 120 through the pressing surface 141, it does not directly rotate counterclockwise but absorbs the impact to some extent through the center O2.

If the pressure angle $\alpha$ increases, the supporting force F of the pressing surface 141 decreases. On the contrary, if the pressure angle $\alpha$ decreases, the supporting force F increases.

Figure 6:
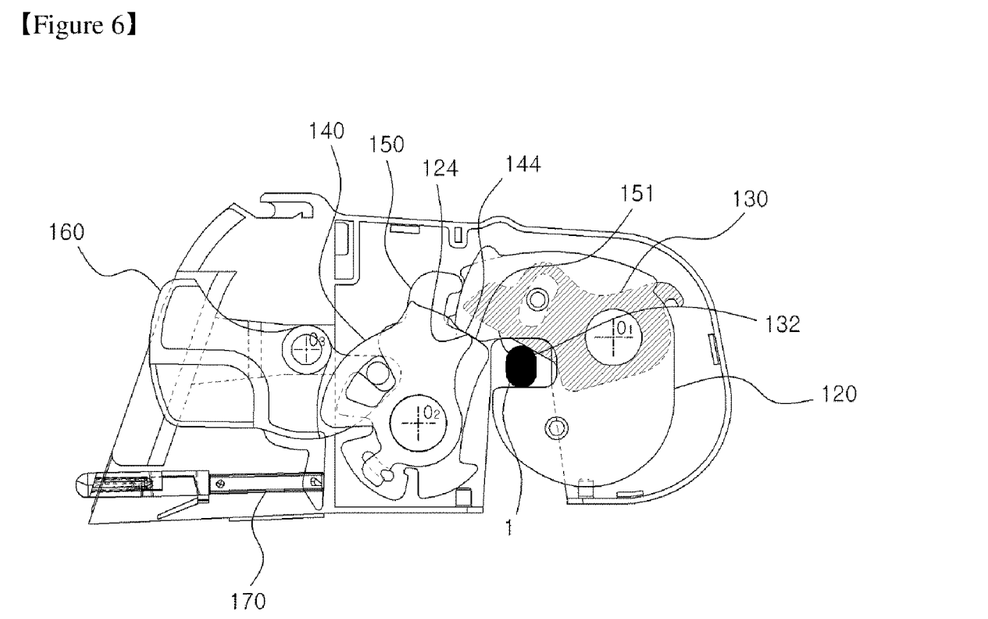
FIG. 6 shows a state of the latch assembly for a vehicle seat in FIG. 3E with an impact thereon.

When the outer impact through the catch 120 exceeds the supporting force F, the pawl plate 140 is pressed by the catch 120 and rotates counterclockwise as shown in FIG. 6.

Accordingly, the locking surface 124 of the catch 120 is supported by the supporting surface 151 of the pawl 150.

At the same time, the locking surface 124 of the catch 120 is also supported by the second supporting surface 144 of the pawl plate 140.

Therefore, the catch 120 is doubly supported in case of the outer impact thus enhancing a safety in use.

Figure 7:
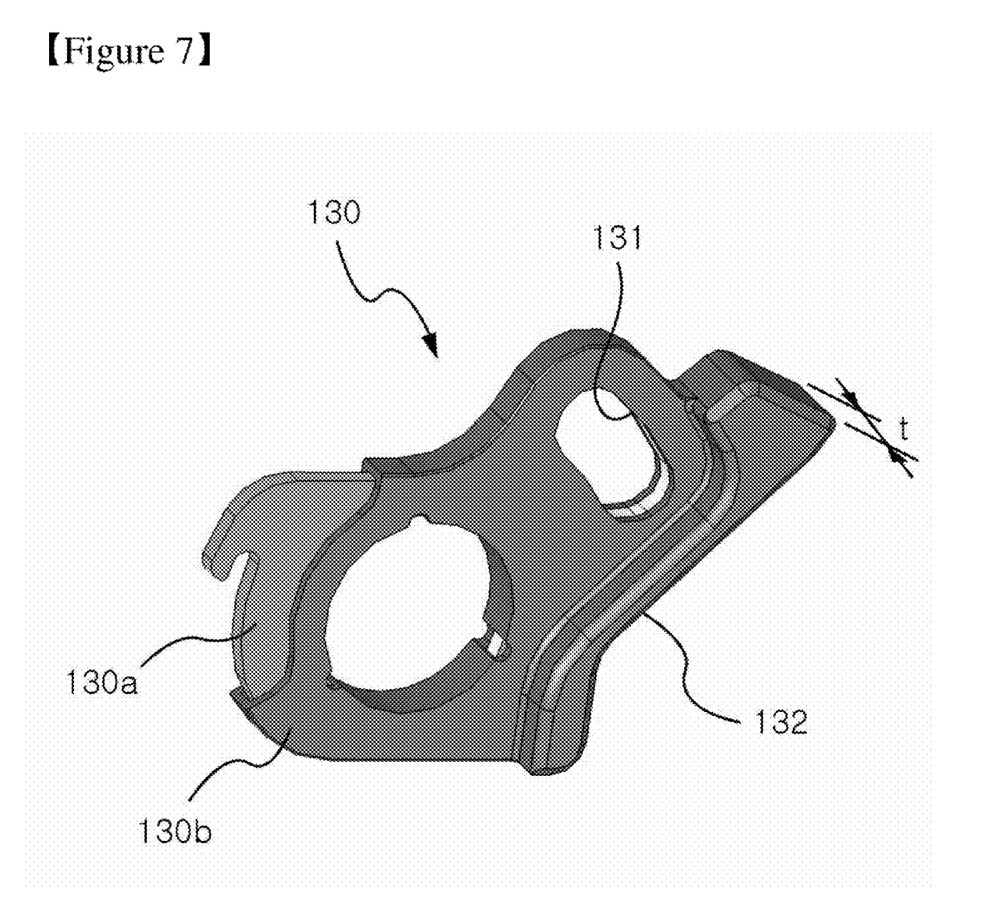
FIG. 7 is an expanded perspective view of a component of the latch assembly for a vehicle seat in FIG. 1.

As shown in FIG. 7, one side part of the damping plate 130 including the damping surface 132 which supports the striker 1 has a thickness t to be bigger than other part of the damping plate 130 to enlarge an area of the damping surface 132 for pressing and supporting the striker 1.

Therefore, a noise due to a generation of a clearance from the locked striker 1 can be absorbed to some extent, so that a generation of the noise can be decreased.

Also, as shown in FIG. 7, the damping plate 130 can be made by integrally forming a steel plate 130a and a plastic plate 130b. Accordingly, the thickness of the damping surface 132 can be easily provided by forming the part comprising the damping surface 132 with the plastic plate. Also, the noise generated between the damping surface 132 and the striker 1 can be much decreased.

The unlocking process of the latch assembly 100 according to the exemplary embodiment of the present invention is in reverse order to the locking process described above.

To briefly describe the unlocking process, if the lever 160 rotates clockwise due to the user's operation in the locking state of FIG. 3E, the pawl 150 and the pawl plate 140 rotate counterclockwise in order, so that the pawl 150, the states of the pawl plate 140 and the catch 120 are changed into those shown in FIG. 3B.

Thereafter, the striker 1 is drawn downward out of the receiving pocket 111, so that the unlocking state of FIG. 2 can be accomplished.

The catch 120 does not have its own elastic pressing means but is pressed elastically by the damping plate 130 in the unlocking direction. Accordingly, in the locking state of FIG. 3E, the catch 120 exerts substantially no force of its own onto the pawl plate 140 as far as the damping plate 130 is supported and stopped by the striker 1.

Therefore, the force required for the unlocking operation, that is the operation for the counterclockwise rotation, of the pawl plate 130 which has been supporting the catch 120 decreases as much, so that the user's operation of the lever 160 for the unlocking can be easily performed.

The latch assembly 100 for a vehicle seat described above can be provided on a seatback for locking and unlocking the seatback onto a vehicle body part. However, the latch assembly according to the present invention is not limited for that use but can also be provided on a seat cushion for locking and unlocking a whole seat onto the vehicle body part.

Although the latch assembly 100 for a vehicle seat according to an exemplary embodiment of the present invention has been shown, it will be appreciated by those skilled in the art that changes may be made in the exemplary embodiment without departing from the principles and spirit of the invention, the scope of which is defined in the appended claims and their equivalents.

The invention claimed is:

1. A latch assembly for vehicle seat, comprising:
a base having a receiving pocket for accommodating a striker of a vehicle body part;
a catch rotatably coupled to the base to rotate between a locking position where the catch supports the striker accommodated in the receiving pocket and an unlocking position where the catch allows the striker to escape from the receiving pocket;
a damping plate rotatably coupled to the base with the same rotating axis as the catch to elastically press the catch to rotate to the unlocking position and having a damping surface which elastically presses and supports the striker accommodated in the receiving pocket;
a pawl plate rotatably coupled to the base and having a pressing surface which presses the catch rotated to the locking position; and
a pawl rotatably coupled to the base with the same rotating axis as the pawl plate and having a supporting surface which supports the catch to prevent a further rotation of the catch if the catch at the locking position starts rotating by passing the pressing surface of the pawl plate due to an outer impact.

2. The latch assembly for vehicle seat according to claim 1 wherein the damping plate and the catch are rotatable therebetween to a predetermined degree of angle through a pin which is provided at one of the damping plate and the catch and a slot which is provided at the other of the damping plate and the catch to couple with the pin.

3. The latch assembly for vehicle seat according to claim 2 wherein the pin is provided to the catch and the slot is provided to the damping plate.

4. The latch assembly for vehicle seat according to claim 1 wherein the catch has a catch pocket which, at the locking position of the catch, accommodates and supports the striker accommodated in the receiving pocket of the base, and
the damping surface of the damping plate, at the locking position of the catch, elastically presses and supports the striker accommodated in the receiving pocket in a state that the damping surface protrudes into an inside of the catch pocket.

5. The latch assembly for vehicle seat according to claim 2 wherein the catch has a catch pocket which, at the locking position of the catch, accommodates and supports the striker accommodated in the receiving pocket of the base, and
the damping surface of the damping plate, at the locking position of the catch, elastically presses and supports the striker accommodated in the receiving pocket in a state that the damping surface protrudes into an inside of the catch pocket.

6. The latch assembly for vehicle seat according to claim 3 wherein the catch has a catch pocket which, at the locking position of the catch, accommodates and supports the striker accommodated in the receiving pocket of the base, and
the damping surface of the damping plate, at the locking position of the catch, elastically presses and supports the striker accommodated in the receiving pocket in a state that the damping surface protrudes into an inside of the catch pocket.

7. The latch assembly for vehicle seat according to claim 4 wherein at least a side part of the damping plate including the damping surface has a thickness larger than a thickness of any other part thereof, so that the side part of the damping surface for pressing and supporting the striker is increased.

8. The latch assembly for vehicle seat according to claim 5 wherein at least a side part of the damping plate including the damping surface has a thickness bigger than any other part thereof, so that an area of the damping surface for pressing and supporting the striker is increased.

9. The latch assembly for vehicle seat according to claim 6 wherein at least a side part of the damping plate including the damping surface has a thickness bigger than any other part thereof, so that an area of the damping surface for pressing and supporting the striker is increased.

10. The latch assembly for vehicle seat according to claim 7 wherein at least a part of the damping plate including the damping surface is made of a plastic resin.

11. The latch assembly for vehicle seat according to claim 8 wherein at least a part of the damping plate including the damping surface is made of a plastic resin.

12. The latch assembly for vehicle seat according to claim 9 wherein at least a part of the damping plate including the damping surface is made of a plastic resin.

13. The latch assembly for vehicle seat according to claim 1 wherein the catch has a locking surface which at the locking position of the catch is supported by the pressing surface of the pawl plate, and
the pressing surface of the pawl plate is a part of an arc whose center is at a distance from a rotating center of the pawl plate and forms a predetermined pressure angle by contacting the locking surface if the catch is at the locking position.

14. The latch assembly for vehicle seat according to claim 1 wherein the pawl plate has a second supporting surface to support the catch together with the supporting surface of the pawl if the catch at the locking position starts rotating by passing the pressing surface of the pawl plate due to the outer impact.

15. The latch assembly for vehicle seat according to claim 1 wherein at the locking position of the catch the striker accommodated in the receiving pocket of the base is supported by the receiving pocket, the catch and the damping plate at the same time.

* * * * *